US005649368A

United States Patent [19]
Herzog et al.

[11] Patent Number: 5,649,368
[45] Date of Patent: Jul. 22, 1997

[54] METHOD FOR CALIBRATING A COORDINATE MEASURING APPARATUS HAVING TWO PIVOT AXES

[75] Inventors: Klaus Herzog, Aalen; Werner Lotze, Dresden, both of Germany

[73] Assignee: Carl Zeiss-Stiftung, Heidenheim, Germany

[21] Appl. No.: 533,273

[22] Filed: Sep. 25, 1995

[30] Foreign Application Priority Data

Sep. 23, 1994 [DE] Germany ............... 44 34 014.1

[51] Int. Cl.$^6$ ............................................. G01B 1/00
[52] U.S. Cl. ........................................ 33/502; 33/567
[58] Field of Search .................. 33/1 M, 502, 542, 33/551, 556, 567, 644, 645

[56] References Cited

U.S. PATENT DOCUMENTS

| | | |
|---|---|---|
| 4,819,195 | 4/1989 | Bell et al. |
| 4,884,348 | 12/1989 | Zeller et al. ............... 33/502 |
| 4,884,889 | 12/1989 | Beckwith, Jr. |
| 4,891,889 | 1/1990 | Tomelleri. |
| 4,962,591 | 10/1990 | Zeller et al. ............... 33/502 |
| 5,396,712 | 3/1995 | Herzog. |

FOREIGN PATENT DOCUMENTS

| | | |
|---|---|---|
| 0304460 | 3/1989 | European Pat. Off. |
| 62-42010 | 2/1987 | Japan ............... 33/502 |
| 1498009 | 1/1978 | United Kingdom. |
| WO89/11631 | 11/1989 | WIPO ............... 33/502 |

OTHER PUBLICATIONS

"QUIKCHEK" Masters for CMM advertisement (Glastonbury Gage Company) Sep. 1990.

*Primary Examiner*—G. Bradley Bennett
*Attorney, Agent, or Firm*—Walter Ottesen

[57] ABSTRACT

The invention is directed to a method for calibrating a coordinate measuring apparatus which has a probe 10. The probe 10 is movably guided in a plane (x, y) via two parallel pivot axes (6, 8) which are arranged one behind the other. For calibrating the primary dimensions (R1, R2, φ0, ψ0, dT) of the coordinate measuring apparatus, contours or geometric elements are contact scanned on a calibration body with the probe. The contours or geometric elements are so selected that the diameter dT of the probe ball 12 attached to the probe enters into the measuring result for the geometric elements or their spacing with different weight or sign. Thereafter, the primary dimensions (R1, R2, φ0, ψ0, dT) are determined from the measured values obtained by contact scanning the contours for the position of the probe 10 in the plane (x, y) and from the known dimensions of the geometric elements.

16 Claims, 4 Drawing Sheets

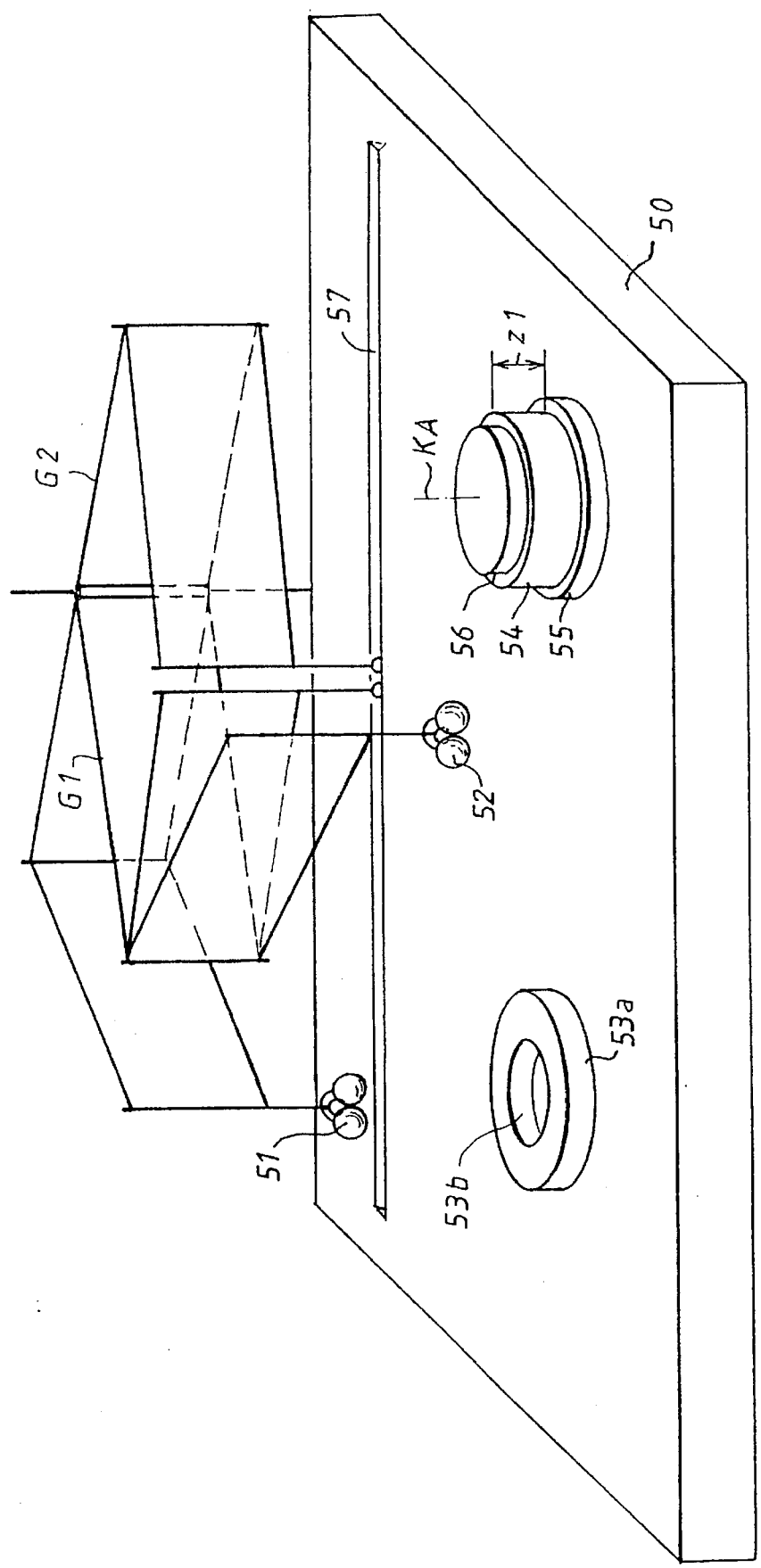

METHOD FOR CALIBRATING A COORDINATE MEASURING APPARATUS HAVING TWO PIVOT AXES

BACKGROUND OF THE INVENTION

The kinematic system of coordinate measuring machines, tool machines and numerous other processing machines has a probe or a tool movable in space or in a plane. When higher requirements as to precision are imposed, two or three linear guides are realized which are built up on each other and are at right angles to each other. Linear measuring systems are provided for the linear guides. These known systems have the advantage of a simple kinematic which can be realized, however, only with very complex constructive measures and high manufacturing cost. In addition, the moved mechanical components of these systems have a relatively high mass.

Planar kinematic systems having two parallel pivot linkages can be realized in a structurally more simple manner. Coordinate measuring apparatus built according to this principle and having probes movably guided at one linkage arm have two parallel pivot axes one behind the other in one plane. These coordinate measuring apparatus are described, for example, in British Patent 1,498,009 and in the following U.S. Patents: U.S. Pat. Nos. 4,891,889 and 5,396,712. The linkage arm of the coordinate measuring apparatus described in U.S. Pat. No. 5,396,712 is additionally mounted on a vertical linear guide having a linear measuring system for detecting the movement of the linkage arm in the vertical z-direction.

The advantage of such arrangements having two parallel pivot axes is the simple mechanical configuration of the low-mass linkage parts. These linkage parts are easy to manipulate when compared to apparatus having cartesian guides and make possible a simple manipulation, for example, for continuous contact scanning of profiles.

However, in order to be able to carry out high precision measurements with the above-mentioned linkage arm apparatus, it is necessary to precisely know the basic geometry of the apparatus, that is, the lengths R1, R2 of the linkage arms, the zero positions $\phi 0$ and $\psi 0$ of the angle measuring systems corresponding to the pivot axes and the diameter dT of the probe ball inserted for measurement. For this purpose, the apparatus must be calibrated not only once but each time when the above-mentioned primary dimensions change. This is, for example, always the case when a new probe is exchanged and inserted. Not only does the diameter of the probe ball change, as a rule, but also the effective length R2 of the second linkage arm.

Furthermore, it is also purposeful to detect the nonparallelism of the pivot axes with respect to each other and with respect to the linear guide on which the linkage arm is mounted. It is also purposeful to detect the elastic deformations of the individual linkage members caused by their own weight and by the actuating and measuring forces in the context of a calibration. The last-mentioned influences can cause systematic errors which become effective via the linkage system in a very complicated manner as spatial measurement and position errors of the probe.

For calibrating coordinate measuring apparatus, laser interferometers have been used in most cases up until now. With laser interferometers, the position of a reflector prism attached to the probe was determined when moving the probe in the measuring range of the coordinate measuring apparatus independently of the measuring systems of the coordinate measuring apparatus. In addition, the so-called ball-rod method is used wherein a rod is provided at both ends with ball joints. In this method, the rod of known length is attached to the measuring table of the coordinate measuring apparatus and to the probe of this apparatus and is pivoted in the measuring range. Calibrating methods of this kind with laser interferometers and ball rods are, for example, described in European patent publication 0,304, 460 and U.S. Pat. Nos. 4,819,195 and 4,884,889. The known calibrating methods are relatively time intensive and require many expensive calibrating tools. These methods are therefore not suitable for making routine calibrations of a coordinate measuring apparatus, for example, after each probe exchange. Furthermore, interferometers are suitable only for calibrating coordinate measuring apparatus which make measurements in cartesian coordinates.

SUMMARY OF THE INVENTION

It is an object of the invention to provide a simple calibrating method for a coordinate measuring apparatus which can be carried out without much complexity. The method is applied to a coordinate measuring apparatus having a probe which is movably guided in a plane via a linkage arm having two successive parallel pivot axes. With this method, at least the primary dimensions which change in short distances should be rapidly determinable.

The method of the invention is for calibrating a coordinate measuring apparatus. The apparatus includes: a probe having a probe ball of a diameter dT attached thereto and a supporting mechanism for movably guiding the probe in a plane (x, y), the supporting mechanism including: a first linkage arm pivotally mounted to pivot about a first pivot axis; a second linkage arm connected to the first linkage arm at a second pivot axis to pivot about the second pivot axis; the first linkage arm having a first length R1 and the second linkage arm having a second length R2; the first and second lengths (R1, R2) and the diameter dT being primary dimensions (R1, R2, dT) of the coordinate measuring apparatus.

The method of the invention includes the steps of calibrating the primary dimensions (R1, R2, dT) as follows: providing a calibration body having geometric elements with the elements defining contours which can be contact scanned with the probe ball and the geometric elements having known predetermined dimensions or spacings; selecting the contours so as to cause the diameter dT of the probe ball to enter a measuring result for the dimensions or spacings of the geometric elements with a different weight or sign; contact scanning the contours with the probe ball to obtain measured values for the position of the probe in the plane (x, y); and, determining the primary measurements (R1, R2, dT) from the measured values and the known predetermined dimensions or spacings of the geometric elements.

With the above-mentioned measures, it is possible to simultaneously and very rapidly determine the five primary dimensions, that is, the lengths R1 and R2 of both linkages, the zero angles $\phi 0$ and $\psi 0$ of the angular measuring systems and the diameter dT of the probe ball. This is done in a simple manner in that, for example, two correspondingly selected geometric elements are contact scanned. From the plurality of measurement values obtained in this manner, the primary dimensions can then be clearly determined with high precision. The measured values can be equated with the known desired contour of the geometric elements.

The geometric elements can, for example, be an inner and an outer contour of a circularly-shaped or rectangular calibration body. When measuring the outer and inner contours, the probe ball diameter is used with respectively different

3 signs. However, it is also possible to use a calibration body which comprises two inner bores which, in turn, are mounted at a fixed known spacing to each other. Although the probe ball diameter is included in the measuring result with the same sign for measuring the two inner contours, the distance of the two contours is, however, independent of the probe ball diameter, that is, the probe ball diameter is used in the spacing with a weight of zero.

Furthermore, the geometric elements can be straight line pairs at different distances to each other such as the opposite-lying sides of a rectangle with side lengths that are clearly different. Then, the probe ball diameter enters with a different weight for measurements of the spacing of the straight line pairs compared to the remaining primary dimensions and can likewise be determined.

It is especially purposeful to supplement the above-described calibration method also for those cases in which the coordinate measuring apparatus has a probe with a probe pin deflectable in the plane (x, y). Here, a calibration standard is contacted and contact scanned several times with a deflection of the probe pin which is different in magnitude and direction and the coefficients of the probe pin deflection are determined from the obtained measured values ($\phi$, $\psi$) for the position of the probe in the plane (x, y) and the measured values (u, v) for the deflection of the probe pin. The coefficients are determined in that the two parallelly recorded groups of measured values are set into relationship with each other.

Further advantageous embodiments and improvements of the calibrating method are directed also to the determination of deviations with respect to parallelism of the pivot axes and the deformations of the linkage arm which are caused by the actuating forces and the weight of the linkage arm itself.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
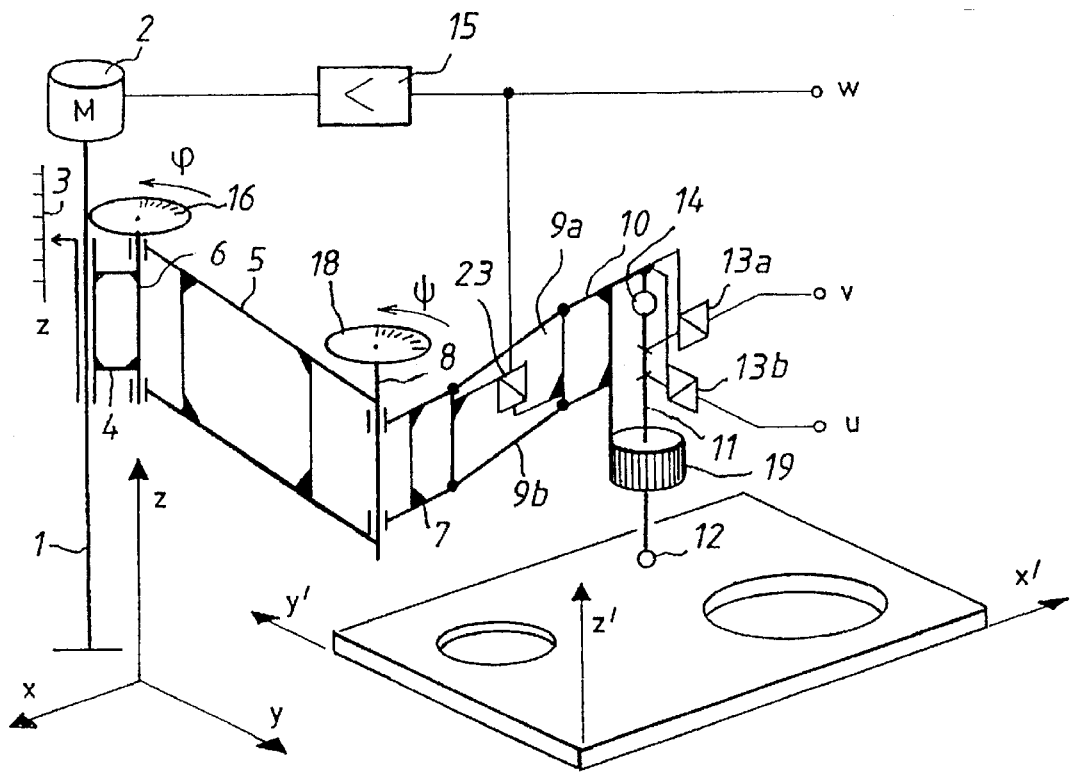
FIG. 1 is a kinematic schematic of a coordinate measuring apparatus having two parallel pivot axes.

The coordinate measuring apparatus shown schematically in FIG. 1 includes a column 1 configured as a vertical z-guide on which a slide or carrier 4 is displaceably journalled with the aid of a drive 2. The vertical z-position can be read out photoelectrically from a scale 3.

The pivot pin 6 is attached to the carrier 4 and the first linkage arm 5 is pivoted about this pivot axis 6 in the plane

4

(x, y). A graduated circle 16 on the axis 6 is likewise read out photoelectrically to give the pivot angle $\phi$.

A second pivot pin 8 is attached to the first linkage arm 5 and is parallel to the vertical pivot pin 6. A second linkage arm 7 is rotatably journalled on this pivot pin 8. A graduated circle 18 in combination with a photoelectric scan system operates to detect the rotational movement of this second pivot pin 8.

The second linkage arm 7 at the same time defines the carrier for a probe 10. The probe 10 is connected to the carrier 7 via a spring parallelogram having the two articulate legs (9a, 9b). The probe 10 is movable in the vertical direction via the spring parallelogram (9a, 9b). The deflection (w) of the spring parallelogram is detected via a measuring system 23 such as an inductive measuring system and is transmitted to the motor 2 via an amplifier 15. The motor 2 controls out larger deflections of the parallelogram by readjusting the carrier 4.

Figure 2:
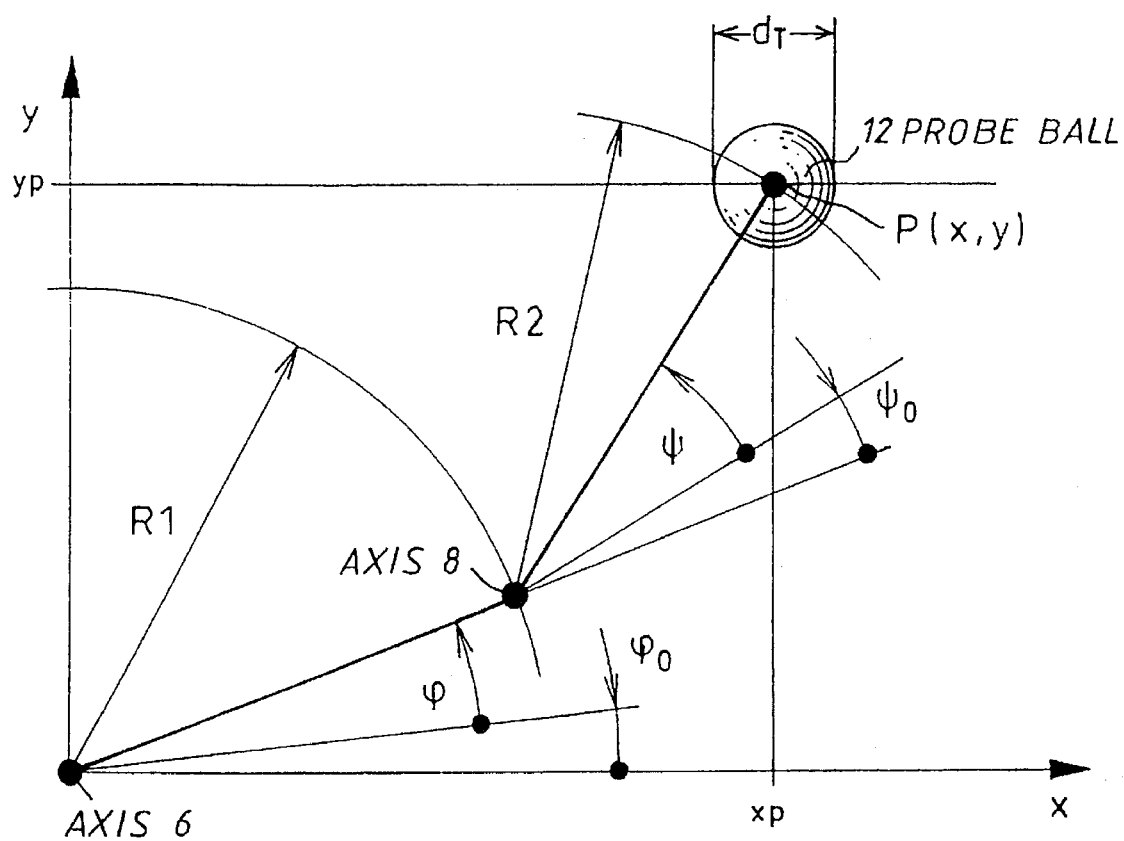
FIG. 2 is a schematic in which the kinematic of the apparatus of FIG. 1 is projected on a plane arranged perpendicularly to the pivot axes.

The probe pin 11 is deflectable in the plane (x, y) via an elastic cardanic joint 14. The extent of the deflection is detected via two measuring systems (13a, 13b) arranged perpendicularly to each other. The position P of the probe ball 12 then results from the measured values $\phi$ and $\psi$ of the respective angular measuring systems (16, 18) in combination with the lengths R1 and R2 of the respective linkage arms (5, 7) in accordance with the following equations which can be easily derived from FIG. 2:

$$XP = R1 \cdot \cos(\phi+\phi 0) + R2 \cdot \cos(\phi+\psi+\phi 0+\psi 0) \quad (1)$$

$$YP = R1 \cdot \sin(\phi+\phi 0) + R2 \cdot \sin(\phi+\psi+\phi 0+\psi 0) \quad (2)$$

wherein the deflections (u, v) of the probe as well as possible apparatus errors are not considered. These possible apparatus errors include, for example, nonparallelism of the pivot pins 6 and 8 and the guide 1.

Whereas the parameters R1 and $\phi 0$ can be considered constant over a longer time span, this does not apply to the parameters R2 and $\psi 0$ as well as to the probe ball diameter dT. These parameters are subject to relatively large changes when exchanging the probe.

If one proceeds from the premise that the probe pin 11 is rigidly connected to the probe and cannot be deflected in the plane (x, y), then the primary dimensions (R1, R2,$\phi 0$, $\psi 0$, dT) can be determined in that the contours of the calibration standards shown in FIGS. 4A to 4D can be contact scanned in a calibrating operation. The calibration standards define simple geometric figures in the projection on a plane.

Figure 4A:
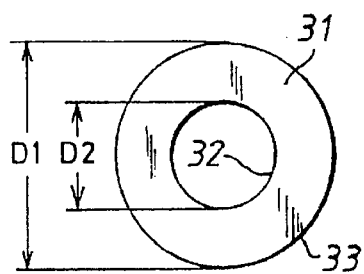
FIGS. 4A to 4D show four calibrating bodies which can be used to determine the primary dimensions of the coordinate measuring apparatus of FIG. 1; and, FIG. 5 is a perspective view of a base plate on which the calibration bodies are arranged which are needed to calibrate all dimensions, inclined positions, deformations, et cetera.

For example, the probe ball 12 is sequentially guided along the inner contour 32 and the outer contour 33 of the ring gauge 31 shown in FIG. 4A each time in the same rotational direction and the diameters D1 and D2 of the ring gauge 31 are known with high precision. In this way, a large number of measurement values is generated for the rotational angles $\phi$ and $\psi$. The number of measurement values in each case can be, for example, 100 to 200. These measurement values must satisfy the following equations in combination with equation (1) and (2):

$$F1 = \sqrt{(XP+XM1)^2 + (YP-YM1)^2} - \frac{D1+dT}{2} = 0 \quad (3)$$

$$F2 = \sqrt{(XP-XM2)^2 + (YP-YM2)^2} - \frac{D2-dT}{2} = 0 \quad (4)$$

wherein the probe ball diameter dT is included with different signs. The quantities XM1 and YM1 are the center point coordinates of the circularly-shaped inner contour and XM2 and YM2 are the center point coordinates of the outer contour. From these equations, all five primary dimensions can be reliably determined.

Figure 4B:
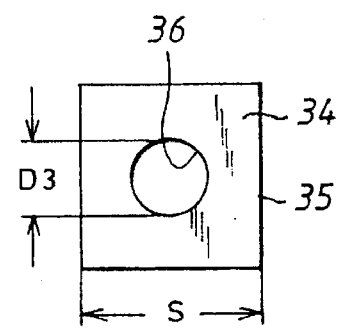

A similar equation system can be established when the parallelopiped shown in FIG. 4B is used as a calibration body. The side length S of the rectangular parallelopiped 34 is known with high accuracy and the rectangular parallelopiped has a central bore having a precisely known diameter D3. Here too, a plurality of measured values is obtained by contact scanning the inner contour 36 of the bore and the outer contour 35 of the parallelopiped. These measured values can be placed into relationship to the dimensions of the calibration body. The probe ball diameter here too enters the measuring result with different signs during contact scanning of the outer contour 35 of the parallelopiped and the inner contour 36 of the bore.

Figure 4C:
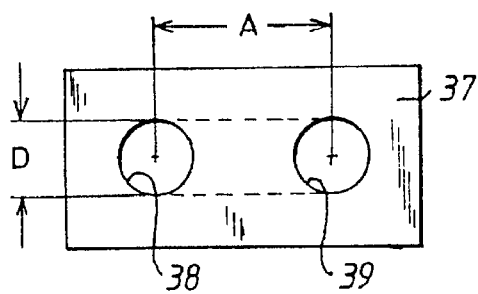

It is otherwise for the calibration body shown in FIG. 4C. This calibration body is in the form of a rectangular parallelopiped 37 having two bores 38 and 39 of like diameters. In contact scanning these bores, the probe ball diameter enters the measuring results with the same sign. However, the fixed spacing A of the two bores 38 and 39 to each other can be determined independently of the diameter of the probe ball, that is, the probe ball diameter enters this spacing with a zero weight.

Figure 4D:
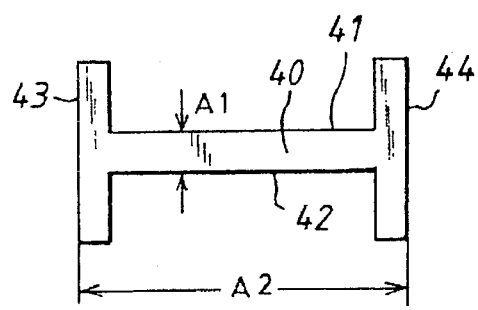

A further possibility for calibrating the primary dimensions is afforded by the calibration body show me FIG. 4D. This calibration body has the form of a H-shaped block 40. The two opposite-lying sides (41, 42) and (44, 43) have very different spacings A1 and A2. The start for a system of equations which are to be solved in the course of the calibrating operation are as follows:

$$F1 = (XP - XM) \cdot NX1 + (YP - YM) \cdot \frac{NY1 \pm A1}{2} + dT = 0 \quad (5)$$

$$F2 = (XP - XM) \cdot NX2 + (YP - YM) \cdot \frac{NY2 \pm A2}{2} + dT = 0 \quad (6)$$

wherein NX1 and NY1 are the coordinates of the normal on the sides (41, 42) and NX2 and NY2 are the coordinates of the normal on the sides (43, 44). The normals intersect at one point and the intersect point coordinates are identified as XM and YM.

A plurality of measured values are generated by contact scanning the opposite-lying sides (41/42 and (43/44) of the block 40. The primary dimensions can be inductively computed. As can be seen, the probe ball diameter in comparison to the remaining primary dimensions enters with very different weight depending upon whether the spacing A2 of the sides 43 and 44 or the spacing A1 of the sides 41 and 42 is measured.

Figure 3:
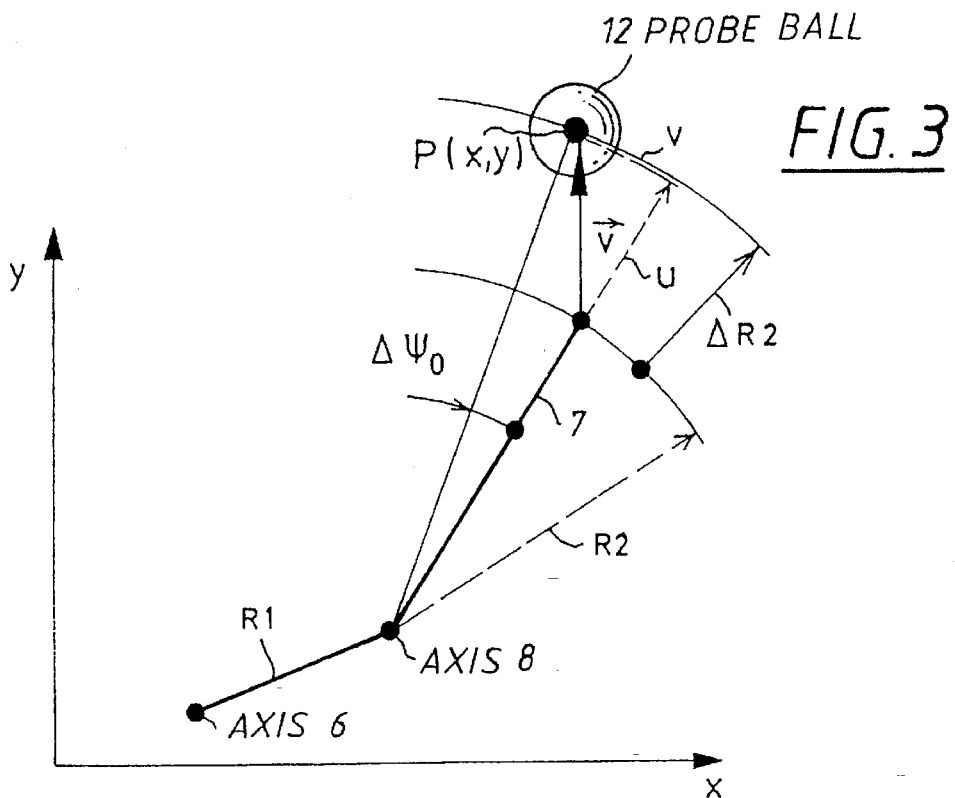
FIG. 3 is a simplified schematic wherein the probe deflection is considered additionally to what is shown in FIG. 2.

In FIG. 1, a probe with a deflectable probe pin 11 is attached to the apparatus. For this case, the characteristics of the probe system to be measured are to be determined in a further calibration step in which the spatial displacements of the linkage arm are placed into relationship with the probe deflections (u, v). The deflection vector (v) in the x-y plane changes the actual primary dimensions R2 and ψ0 of the linkage arm. This subject matter is shown in FIG. 3.

The simplest case is when the measuring systems which measure the probe deflections (u, v) are aligned parallelly or perpendicularly to the linkage arm 7. In this case, the changes of R2 and ψ result from the signals (u, v) in accordance with the following relationships:

$$\Delta R2 = a1 \cdot u \quad (7)$$

$$\Delta \psi = a2 \cdot v / R2 \quad (8)$$

wherein: a1 and a2 are the probe coefficients which convert the signals (u, v) of the probe pin deflection in correspondence to the probe pin length.

The determination of the primary dimensions (R1, R2, φ0, ψ0, dT) can be carried out with a deflectable probe pin instead of with a rigid probe pin. If this is done, then the equations (1) and (2) have to be supplemented in that R2 and ψ from equations (1) and (2) are substituted by the following: R2'=R2+ΔR2 and ψ'=ψ+Δψ and for ΔR2 and Δψ, the quantities given in the equations (7) and (8) are substituted. The following is then obtained:

$$XP = R1 \cos(\phi - \phi 0) + (R2 + a1u) \cdot \quad (9)$$
$$\cos\left(\phi - \phi 0 + \psi - \psi 0 + \frac{a2}{R2} \cdot v\right)$$

$$Yp = R1 \sin(\phi - \phi 0) + (R2 + a1u) \cdot \quad (10)$$
$$\sin\left(\phi - \phi 0 + \psi - \psi 0 + \frac{a2}{R2} \cdot v\right)$$

For producing defined relationships between the probe deflections and the spatial displacements of the linkage arms, one can proceed so that a definite calibrating standard can be contact scanned with a deflection of the probe pin 11 and/or with changing guiding force in a specific location or by measuring by contact scanning in a measurement plane at several locations. The deflection of the probe pin fluctuates in accordance with magnitude and direction. For example, the calibration standard can be configured as a cube corner, a conical central bore or three balls in which the probe ball is fixed and thereafter the position of the linkage arm is slightly varied so that probe deflections and changes of the linkage arm result simultaneously. For the measured values (φ, ψ, u and v), the following relationship results from equations (9) and (10):

$$R1 \cdot \cos(\phi - \phi 0) + (R2 + a1u) \cdot \quad (11)$$
$$\cos\left(\phi - \phi 0 + \psi - \psi 0 + \frac{a2}{R2} \cdot v\right) - XP = 0$$

$$R1 \cdot \sin(\phi - \phi 0) + (R2 + a1u) \cdot \quad (12)$$
$$\sin\left(\phi - \phi 0 + \psi - \psi 0 + \frac{a2}{R2} \cdot v\right) - YP = 0$$

From the above, the coefficients a1 and a2 can be determined by means of a Gaussian regression computation.

The determination of the primary dimensions and the determination of the coefficients of the probe deflection takes place in accordance with an iterative process. In this process, measured values are used which are determined on one of the calibration standards of FIGS. 4A to 4D and stored and other measured values are also used which are obtained by contact scanning, for example, of a cube corner with variable deflection. These measured values are used many times sequentially in order to solve the equations, for example, (3) and (4) in combination with (9) and (10) as well as (11) and (12). After approximately four iterative steps, precise values for the probe coefficients (a1, a2) and the primary dimensions (R1, R2, φ0, ψ0, dT) are obtained.

The probe coefficients can, to some extent, also be dependent upon the angular position of the linkage arms 5 and 7, that is, from the angle. For this reason, it is recommended to carry out the above-mentioned measurements in at least two defined linkage positions wherein the linkage arm is once folded and once extended as shown in FIG. 5. There, two sets (51, 52) of three balls are mounted at different locations on the base plate 50. Contact is made in a first set with the linkage arm extended and in a second set with the linkage arm folded.

The calibration of the probe deflection (w) in the z-direction (that is, substantially the determination of the linearity of the measuring system 23) can take place in FIG.

1 very simply in that the motor 2 is driven within the permissible measuring range of the measuring system 23 with the probe 11 held tight, that is, the carrier or sled 4 makes a calibration trip and the measurement values of the z-measuring system 3 are used in order to calibrate the signals of the transducer 23.

Until now, the assumption was made that the two pivot axes 6 and 8 are precisely parallel to each other and to the z guide 1. This condition cannot always be maintained when using reasonable construction and manufacturing techniques.

Figure 1A:
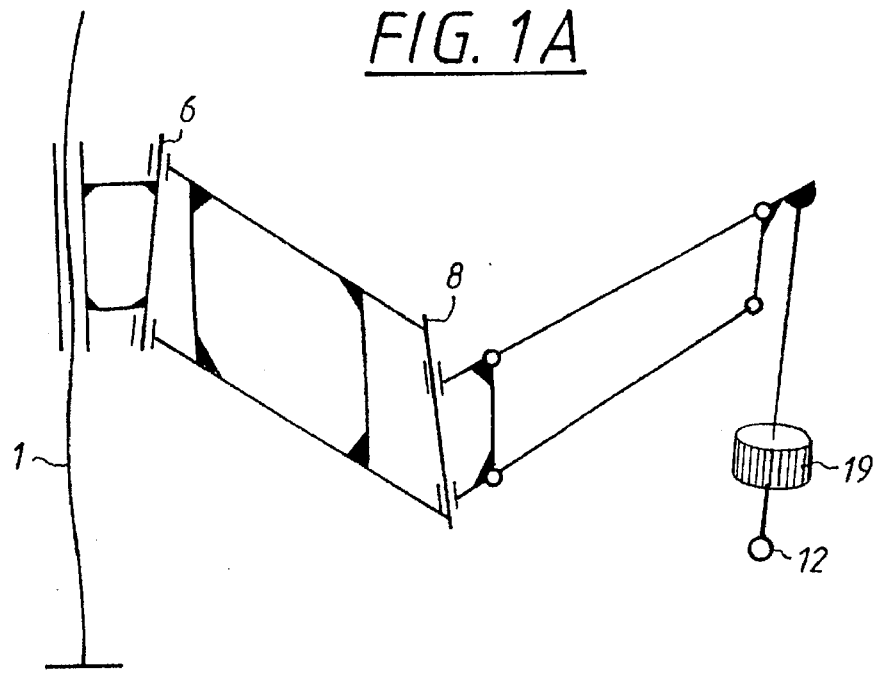
FIG. 1A is a simplified schematic of the kinematic of the apparatus of FIG. 1 wherein, however, the non-parallelism of the pivot axes and the deformations of the pivot arms are exaggerated.

As a rule, the apparatus deforms more or less as shown exaggerated in FIG. 1A.

To determine the nonparallelism of the two pivot axes 6 and 8, a plane or a straight line can be contact scanned in the two linkage positions shown by the broken line in FIG. 5. The straight line can, for example, be embodied as a slot 57 formed in the base plate 50 as also shown in FIG. 5. The inclined position of the two axes 6 and 8 with respect to each other is determined from the difference of the measured values in the two linkage positions. This inclined position can be caused by the assembly of the pivot pins but also by elastic deformation caused by the weight of the linkage arms (5, 7) themselves.

To detect elastic deformations separately, a defined calibrating standard such as the jacket of the cylinder 54 (FIG. 5) having the radius R and the axial coordinates Xm and Ym is contact scanned with the z axis clamped, that is, with the motor 2 blocked and with fluctuating vertical deflection and/or guiding force Fv. In lieu of the vertically standing cylinder, it is also possible to use another calibration standard with perpendicular surfaces such as a rectangular parallelopiped or other prismatic part. The measured values obtained in this manner are brought into a relationship with each other and with the remaining measured values of the calibration and the correction parameters (C1, C2) for the deformation can be determined from the following equations:

$$F1 = \sqrt{(XP - Xm)^2 + (Y - Ym)^2} - R = 0 \tag{13}$$

$$XP = R1 \cdot \cos(\phi - \phi 0) + R2 \cdot \cos(\phi - \phi 0 + \psi - \psi 0) + \tag{14}$$

$$\{C1 \cdot \sin(\phi - \phi 0) \cdot \sin(\psi - \psi 0) +$$

$$C2 \cdot \cos(\phi - \phi 0) \cdot \cos(\psi - \psi 0)\} \cdot Fv$$

$$YP = R1 \cdot \sin(\phi - \phi 0) + R2 \cdot \sin(\phi - \phi 0 + \psi - \psi 0) + \tag{15}$$

$$\{-C1 \cdot \cos(\phi - \phi 0) \cdot \sin(\psi - \psi 0) +$$

$$C2 \cdot \sin(\phi - \phi 0) \cdot \cos(\psi - \psi 0)\} \cdot Fv$$

To determine the inclined position of the first pivot axis 6 with respect to the z guide 1, a spatial calibrating standard can be scanned along which embodies a pivot location. Such a standard is, for example, embodied by the two continuous slots 55 and 56 on the cylinder 54 mounted on the plate 50 as shown in FIG. 5. By contact scanning the slot 55 with the probe ball 12, measured values are obtained. These measured values define an axis KA aligned in space with the coordinate measuring system (x', y', z') defined thereby. The slot 56 has a center point M2 which lies with high precision on the axis KA. By then contact scanning the slot 56, one measures an offset of the center point M2 when the pivot axis 6 is inclined. The inclined position ($\delta x$, y) of the first pivot axis 6 results from the coordinates $\Delta XM1$ and $\Delta XM2$ of this offset in accordance with the following equations:

$$\delta x = \frac{\Delta XM2}{z1} \tag{16}$$

$$\delta y = \frac{\Delta YM2}{z1} \tag{17}$$

wherein: z1 is the spacing of the two slots 55 and 56 on the cylinder 54. This spacing is known with high accuracy.

As described above, the calibration of the primary dimensions (R1, R2, $\phi 0$, $\psi 0$, dT) as well as the probe parameters a1 and a2 is necessary relatively often, for example, after each exchange of a probe. On the other hand, the bending parameters and the inclined position of the axes must be determined only once after manufacture of the coordinate measuring apparatus. However, it is purposeful to mount all calibrating standards, which are required for calibration, on a common plate as shown in FIG. 5. Then, individual or all calibrating steps can be carried out after the plate 50 is placed on the measuring table of the coordinate measuring apparatus. The sequence is then as follows: namely, that, for example, the calibrating mode is called up on the computer connected to the coordinate measuring apparatus whereupon the computer requires the operator to position the plate and make contact in the calibration bodies (51, 52) mounted on the plate or to contact scan the contours (53a, 53b, 54, 56) as described above. From the measured values, the computer then computes the calibrating data and stores the same for the actual measuring process on the workpieces to be measured having unknown geometrical deviations.

It is understood that the foregoing description is that of the preferred embodiments of the invention and that various changes and modifications may be made thereto without departing from the spirit and scope of the invention as defined in the appended claims.

What is claimed is:

1. A method of calibrating a coordinate measuring apparatus including a probe having a probe ball of a diameter dT attached thereto and a supporting mechanism for movably guiding said probe in a plane (x, y), said supporting mechanism including: a first linkage arm pivotally mounted to pivot about a first pivot axis; a second linkage arm connected to said first linkage arm at a second pivot axis to pivot about said second pivot axis; said first linkage arm having a first length R1 and said second linkage arm having a second length R2; said first and second lengths (R1, R2) and said diameter dT being primary dimensions (R1, R2, dT) of said coordinate measuring apparatus, the method comprising the steps of calibrating said primary dimensions (R1, R2, dT) as follows:

providing a calibration body having geometric elements with said elements defining contours which can be contact scanned with said probe ball and said geometric elements having known predetermined dimensions or spacings;

selecting said contours so as to cause said diameter dT of said probe ball to enter a measuring result for the dimensions or spacings of said geometric elements with a different weight or sign;

contact scanning said contours with said probe ball to obtain measured values for the position of said probe in said plane (x, y); and, determining said primary dimensions (R1, R2, dT) from said measured values and said known predetermined dimensions or spacings of said geometric elements.

2. The method of claim 1, wherein said first linkage arm is pivotally mounted to pivot about said first pivot axis from a first zero angle $\phi 0$; said second linkage arm is connected to said first linkage arm at said second pivot axis to pivot about said second pivot axis from a second zero angle $\psi 0$; and, said first and second zero angles ($\phi 0$, $\psi 0$) also being primary dimensions of said coordinate measuring apparatus.

3. The method of claim 1, wherein each of said geometric elements has an inner contour which is either circular or rectangular and an outer contour which is either circular or rectangular.

4. The method of claim 3, wherein said geometric elements are defined by the inner and outer contours of an annular calibration body.

5. The method of claim 1, wherein said geometric elements have inner or outer contours which are arranged at a fixed known mutual spacing A to each other.

6. The method of claim 5, wherein said geometric elements each have two bores at a fixed mutual spacing (A).

7. The method of claim 2, wherein said geometric elements are each a pair of straight lines at different spacings or are opposite-lying sides of a rectangle with different side lengths.

8. The method of claim 6, wherein said probe has a probe pin deflectable in the plane (x, y); and, wherein the method comprises the further step of:

placing the deflection of said probe pin into a relationship with the movements of the probe in the plane (x, y) by contact scanning a calibration standard repeatedly with deflections (u, v) of the probe pin different in magnitude and direction to obtain measured values ($\phi$, $\psi$) for the position of said probe in said plane (x, y); and, determining the coefficients (a1, a2) of the probe pin deflection (u, v) in said plane (x, y).

9. The method of claim 8, wherein said calibration standard is contact scanned in at least two distinct positions of said probe in the measuring region of said coordinate measuring apparatus.

10. The method of claim 9, said calibration standard being defined by one or more centering bodies arranged at positions in said measuring region so that said second linkage arm assumes different angular positions when said probe pin contacts said centering bodies.

11. The method of claim 8, wherein the determination of said primary dimensions (R1, R2, $\phi 0$, $\psi 0$, dT) is performed iteratively and the determination of said coefficients (a1, a2) of said probe pin deflection after recording of the measuring points on said geometric elements and said calibration standard is likewise performed iteratively.

12. The method of claim 1, further comprising contact scanning a straight line or a plane with said probe in two possible different linkage arm positions (G1, G2) and obtaining measured values corresponding to said positions; determining deviations from parallelism of said pivot axes from the difference of said measured values.

13. The method of claim 2, wherein an elastic deformation of said linkage arms can occur because of the deflection (w) of the probe in the direction of the pivot axes; and, wherein the method further comprises:

contact scanning a measuring surface parallel to said pivot axes with a deflection of said probe different according to magnitude and direction to obtain measured values; and, placing said measured values in relationship to each other as well as to the calibrated data for said primary dimensions (R1, R2, $\phi 0$, $\psi 0$, dT) and determining the correction parameters (C1, C2) for the elastic deformation of said linkage arms.

14. The method of claim 13, wherein said measuring surface is the surface of a cylinder parallel to said pivot axes or a prismatic part having surfaces parallel to said pivot axes.

15. The method of claim 1, wherein said coordinate measuring apparatus further includes a linear guide parallel to said pivot axes and said first linkage arm is connected to said linear guide to pivot about said first pivot axis; and, wherein the method further comprises determining a deviation of parallelism between said first pivot axis and said guide by contact scanning a surface parallel to said pivot axes at several locations spaced in the direction (z) of said guide.

16. The method of claim 8, wherein said geometric elements or calibration standards and measurement surfaces or measurement lines are all mounted in common on a base plate.

* * * * *

UNITED STATES PATENT AND TRADEMARK OFFICE
CERTIFICATE OF CORRECTION

PATENT NO. : 5,649,368
DATED : July 22, 1997
INVENTOR(S) : Klaus Herzog and Werner Lotze It is certified that error appears in the above-identified patent and that said Letters Patent is hereby corrected as shown below:

In column 4, line 32: delete $$\text{"YP} = R1 \cdot \sin(\phi + \psi 0) + R2 \cdot \sin(\phi + \psi + \phi 0 + \psi 0) \qquad (2)\text{"}$$

and substitute therefor $$-- \text{YP} = R1 \cdot \sin(\phi + \phi 0) + R2 \cdot \sin(\phi + \psi + \phi 0 + \psi 0) \qquad (2) --.$$

In column 4, line 61: delete $$\text{"F1} = \sqrt{(XP + XM1)^2 + (YP - YM1)^2} - \frac{D1 + dT}{2} = 0 \qquad (3)\text{"}$$

and substitute therefor $$-- \text{F1} = \sqrt{(XP - XM1)^2 + (YP - YM1)^2} - \frac{D1 + dT}{2} = 0 \qquad (3) --.$$

UNITED STATES PATENT AND TRADEMARK OFFICE
CERTIFICATE OF CORRECTION

PATENT NO. : 5,649,368
DATED : July 22, 1997
INVENTOR(S) : Klaus Herzog and Werner Lotze It is certified that error appears in the above-identified patent and that said Letters Patent is hereby corrected as shown below:

In column 5, line 26: delete "show me" and substitute -- shown in -- therefor.

In column 5, line 43: delete "(41/42" and substitute -- (41/42) -- therefor.

In column 10, line 8: between";" and "deter-", insert -- and, --.

Signed and Sealed this

Fourteenth Day of April, 1998

Attest:

BRUCE LEHMAN

*Attesting Officer*    *Commissioner of Patents and Trademarks*